(12) United States Patent
Dempo et al.

(10) Patent No.: US 7,953,081 B2
(45) Date of Patent: May 31, 2011

(54) MOBILE COMMUNICATION CONTROL METHOD, MOBILE COMMUNICATION SYSTEM, ROUTING DEVICE, MANAGEMENT DEVICE, AND PROGRAM

(75) Inventors: Hiroshi Dempo, Minato-ku (JP); Kaoru Yoshida, Minato-ku (JP)

(73) Assignee: NEC Corporation, Tokyo (JP)

( * ) Notice: Subject to any disclaimer, the term of this patent is extended or adjusted under 35 U.S.C. 154(b) by 867 days.

(21) Appl. No.: 11/909,221

(22) PCT Filed: Jan. 16, 2006

(86) PCT No.: PCT/JP2006/300429
§ 371 (c)(1),
(2), (4) Date: Sep. 20, 2007

(87) PCT Pub. No.: WO2006/112095
PCT Pub. Date: Oct. 26, 2006

(65) Prior Publication Data
US 2008/0192679 A1    Aug. 14, 2008

(30) Foreign Application Priority Data
Mar. 31, 2005  (JP) ................................. 2005-103611

(51) Int. Cl.
*H04L 12/28* (2006.01)
(52) U.S. Cl. .......................... 370/389; 370/352; 370/331
(58) Field of Classification Search .................. 370/331, 370/352, 389; 455/417
See application file for complete search history.

(56) References Cited

U.S. PATENT DOCUMENTS

| 2002/0118674 A1* | 8/2002 | Faccin et al. | 370/352 |
| 2004/0047348 A1* | 3/2004 | O'Neill | 370/389 |
| 2004/0205211 A1* | 10/2004 | Takeda et al. | 709/230 |

FOREIGN PATENT DOCUMENTS

| CN | 1592475 A | 3/2005 |
| JP | 2002-44141 A | 2/2002 |
| JP | 2004-112727 A | 4/2004 |
| JP | 2005-26941 A | 1/2005 |
| JP | 2005-33469 A | 2/2005 |
| JP | 2005-210645 A | 8/2005 |
| JP | 2005-236610 A | 9/2005 |

OTHER PUBLICATIONS

Nagura, et al., "Mobile IPv6 Handover ni Oite Packet Ketsuraku o Hassei Sasenai Kiko no Sekkei to Jisso (The design and implementation of a mechanism to avoid generating packet loss in Mobile IPv6 handover)", Information Processing Society of Japan Kenkyu Hokoku 2003-MBL-25, 2003, pp. 1-8, vol. 2003, No. 67.

* cited by examiner

*Primary Examiner* — Ricky Ngo
*Assistant Examiner* — David Oveissi
(74) *Attorney, Agent, or Firm* — Sughrue Mion, PLLC

(57) ABSTRACT

When a mobile terminal (10a) moves from an access network (21a) to another access network (21c), the unique information on destination of the mobile terminal (10a) in an access router (20c) is transferred as alternate information from an access router (20a) to a home agent (30a). The access router (20c) transfers the unique information on destination of the mobile terminal (10a) in the access router (20a) as original information to the home agent (30a) and at the same time transfers the unique information on destination of the mobile terminal (10a) in the access router (20c) as alternate information to the home agent (30a). Using these data, the home agent (30a) builds security association for the mobile terminal (10a) between the access router (20c) and the home agent (30a).

13 Claims, 6 Drawing Sheets

Fig. 5

| HoA | CoA |
|---|---|
| 2000 :: 1 | 4000 :: 101 |
| 3000 :: 2 | 4000 :: 102 |
| ⋮ | ⋮ |

Fig. 6

| HoA | CoA |
|---|---|
| 2000 :: 1 | 4000 :: 101 |
| 2000 :: 2 | 5000 :: 101 |
| ⋮ | ⋮ |

MOBILE COMMUNICATION CONTROL METHOD, MOBILE COMMUNICATION SYSTEM, ROUTING DEVICE, MANAGEMENT DEVICE, AND PROGRAM

TECHNICAL FIELD

The present invention relates to a mobile communication control method, mobile communication system, routing device, management device, and program, and more particularly to a mobile communication control method, mobile communication system, routing device, management device, and program using IP (Internet Protocol) technique.

BACKGROUND ART

With recent advancement of mobile communication technology, standardization of mobile IPv6 has been under way in IETF (Internet Engineering Task Force).

FIG. 1 is a view illustrating an exemplary configuration of a conventional mobile communication system based on mobile IPv6.

As illustrated in FIG. 1, in this conventional example, there are provided two home agents 130a and 130b respectively having home core networks 131a and 131b, and communication based on transmission/reception of IP packet is performed between mobile terminal 110a having its movement information managed by home agent 130a and mobile terminal 110b having its movement information managed by home agent 130b. Mobile terminal 110a lies in access network 121a under access router 120a, and mobile terminal 110b lies in access network 121b under access router 120b. Mobile terminals 110a and 110b each have a home address (HoA: Home Address) being unique IP address, and these home addresses (HoA) are registered with home agents 130a and 130b, respectively.

The communication method between the two mobile terminals 110a and 110b in the mobile communication system illustrated in FIG. 1 will be described below.

First, the location registration processing of the mobile terminals 110a and 110b will be described.

When mobile terminal 110a moves from home core network 131a under home agent 130a or another access network to access network 121a under access router 120a, firstly CoA (Care of Address) being destination IP address is produced in mobile terminal 110a by use of prefix of IP address of access router 120a and MAC address of mobile terminal 110a, and a combination of a home address of mobile terminal 110a and this CoA is sent to home agent 130a, whereby location registration request (BU: Binding Update) is made. Similarly, in mobile terminal 110b, location registration request (BU) is made with home agent 130b by use of a home address of mobile terminal 110b and CoA produced in access network 121b.

In home agent 130a, after receiving location registration request (BU) from mobile terminal 110a, its validity is verified, and then the home address and CoA sent from mobile terminal 110a are associated with each other and registered with BC (Binding Cache) in home agent 130a and at the same time, location registration acknowledgement (BA: Binding Acknowledgement) indicating that location registration has been made is sent to mobile terminal 110a. Similarly, in home agent 130b, location registration of mobile terminal 110b is made, and location registration acknowledgement (BA) is sent to mobile terminal 110b.

In this way, the current locations of mobile terminals 110a and 110b are managed by home agents 130a and 130b, and thus the movement information of mobile terminals 110a and 110b is managed.

The processing performed when communication based on transmission/reception of IP packet is performed between mobile terminals 110a and 110b after the above described location registration processing has been performed, will now be described by taking as an example a case where an IP packet is sent from mobile terminal 110a to mobile terminal 110b. In the following description, the home addresses of mobile terminals 110a and 110b are referred to as "HoA1" and "HoA2", respectively, and CoA's of mobile terminals 110a and 110b are referred to as "CoA1" and "CoA2", respectively.

In sending an IP packet from mobile terminal 110a to mobile terminal 110b, firstly an IP packet having "HoA1" as originating address and "HoA2" as destination address is encapsulated in mobile terminal 110a by using "CoA1" as originating address and IP address "HA1" of home agent 130a as destination address, and this encapsulated IP packet is sent from mobile terminal 110a.

The IP packet sent from mobile terminal 110a, having IP address "HA1" of home agent 130a as destination address, is delivered via access router 120a to home agent 130a. In home agent 130a, upon reception of the IP packet sent from mobile terminal 110a, the received IP packet is decapsulated and an IP packet having "HoA1" as originating address and "HoA2" as destination address is sent.

The IP packet sent from home agent 130a, having "HoA2" as destination address, is delivered to home agent 130b. In home agent 130b, upon reception of the IP packet sent from home agent 130a, binding cache (BC) in home agent 130b is consulted to recognize care of address "CoA2" of mobile terminal 110b as destination of the IP packet, and the received IP packet is encapsulated by using IP address "HA2" of home agent 130b as originating address and "CoA2" as destination address, and the encapsulated IP packet is sent from home agent 130b.

The IP packet sent from home agent 130b, having "CoA2" as destination address, is delivered via access router 120b to mobile terminal 110b having "CoA2" as care of address. In mobile terminal 110b, upon reception of the IP packet sent from home agent 130b, the received IP packet is decapsulated, and the IP packet having "HoA1" as originating address and "HoA2" as destination address is received.

In this way, according to mobile IPv6, since the current locations of mobile terminals 110a and 110b are managed by home agents 130a and 130b, respectively, even when mobile terminals 110a and 110b move, IP packets directed to mobile terminals 110a and 110b are transferred via home agents 130a and 130b to mobile terminals 110a and 110b; thus movement penetration is ensured (for example, refer to Japanese Patent Laid-Open No. 2005-26941).

Here, the above described mobile IPv6 includes a technique of optimizing the communication route between mobile terminals 110a and 110b transmitting/receiving IP packets. The communication route optimization processing will be described below.

As described above, when an IP packet sent from mobile terminal 110a to mobile terminal 110b is encapsulated by using IP address "HA2" of home agent 130b as originating address and "CoA2" as destination address, mobile terminal 110b sends a combination of home address "HoA2" and care of address "CoA2" of mobile terminal 110b to mobile terminal 110a to make location registration request (BU).

In mobile terminal 110a, upon reception of the location registration request (BU) sent from mobile terminal 110b, its validity is verified, and then a combination of home address "HoA2" and care of address "CoA2" of mobile terminal 110b is registered with a memory for route optimization and at the same time, location registration acknowledgement (BA) is sent to mobile terminal 110b.

Thereafter, in sending an IP packet directed to mobile terminal 110b from mobile terminal 110a, an IP packet having "CoA1" as originating address, "CoA2" as destination address and "HoA1" as home address option is sent from mobile terminal 110a. This IP packet is delivered to mobile terminal 110b without passing through home agents 130a and 130b.

This communication route optimization processing prevents the communication route from becoming redundant to cause delay in transmitting/receiving IP packets between mobile terminals 110a and 110b (for example, refer to Japanese Patent Laid-Open No. 2005-33469).

However, in this technique of optimizing a communication route between mobile terminals 110a and 110b, care of address "CoA1" and care of address "CoA2" indicating the current location of mobile terminals 110a and 110b are transferred to the other communication party, so the current locations of each mobile terminal are known by the other communication party.

Thus, for the communication where communication route is optimized, there has been studied an edge mobility technique of access routers 120a and 120b encapsulating or decapsulating IP packets transmitted/received between mobile terminals 110a and 110b. According to this edge mobility technique, instead of mobile terminals 110a and 110b, access routers 120a and 120b perform the above described location registration request (BU) with home agents 130a and 130b, the generation of care of address "CoA" of mobile terminals 110a and 110b, and the route optimization processing.

Accordingly, care-of addresses "CoA1" and "CoA2" of mobile terminals 110a and 110b are managed not in mobile terminals 110a and 110b but in access routers 120a and 120b. Also, when mobile terminals 110a and 110b perform IP packet transmission/reception via the above described optimized route without using home agents 130a and 130b, care of addresses "CoA1" and "CoA2" of mobile terminals 110a and 110b are transmitted/received only between access routers 120a and 120b. Consequently, care of address is not transferred to the other communication party, thus allowing prevention of the current location of the mobile terminals from being known by the other communication party.

Further, in the above described mobile IPv6, there is used a technique of building security association (SA) for IP packet transmission/reception to/from mobile terminals 110a and 110b by delivering between access routers 120a and 120b and home agents 130a and 130b to which the edge mobility technique is applied, the unique information on mobile terminals 110a and 110b and the unique information on home agents 130a and 130b each stored in access routers 120a and 120b. The method of building security association between access router 120a and home agent 130a illustrated in FIG. 1 will be described below by taking as an example a case where security association is built up for IP packet transmission/reception to/from mobile terminal 110a.

When mobile terminal 110a moves from home core network 131a under home agent 130a or another access network to access network 121a under access router 120a, firstly care of address for mobile terminal 110a is produced in access router 120a under which lies access network 121a to which mobile terminal 110a has moved, by use of prefix of IP address of access router 120a and MAC address of mobile terminal 110a, and this care of address and the home address of mobile terminal 110a are associated with each other and registered with an internal memory. As a result, a proxy function for mobile terminal 110a using the produced care of address is set in access router 120a.

Subsequently, an encryption transmission route for signaling between the care of address for mobile terminal 110a and the home address of home agent 130a is built between access router 120a and home agent 130a by use of IKE (Internet Key Exchange).

Subsequently, FQDN (Fully Qualified Domain Name) for mobile terminal 110a in access router 120a is transferred from access router 120a to home agent 130a on ISAKMP (Internet Security Association and Key Management Protocol.

Then, FQDN in home agent 130a is transferred from home agent 130a to access router 120a on ISAKMP.

Subsequently, the home address of mobile terminal 110a is transferred from access router 120a to home agent 130a on ISAKMP and in response to this, the IP address of home agent 130a is transferred from home agent 130a to access router 120a on ISAKMP.

Thereafter, a combination of the home address of mobile terminal 110a and the care of address produced for mobile terminal 110a is sent from access router 120a to home agent 130a, whereby location registration request (BU) is made.

Then, its validity is verified in home agent 130a, and thereafter the home address and care of address sent from the mobile terminal 110a are associated with each other and registered with binding cache (BC) in home agent 130a, and at the same time an encryption transmission route for user data between the care of address for mobile terminal 110a and the home address of home agent 130a is built between access router 120a and home agent 130a by use of IKE.

When security association is built in this way, home agents 130a and 130b receive only IP packets sent from the mobile terminals for which security association has been built.

As described above, when security association for the mobile terminal is built between the access router and home agent, the home address of the mobile terminal for which security association is to be built is transferred from the access router to the home agent; but when the mobile terminal moves, and the access router in which a proxy function for the mobile terminal is set is changed, and that access router similarly performs a processing for building security association between the home agent and the access router, since the home address of the mobile terminal has already been registered in the home agent as the home address of the mobile terminal for which security association has been built, security association for the mobile terminal cannot be built in the destination access router of the mobile terminal.

DISCLOSURE OF THE INVENTION

An object of the present invention is provide a mobile communication control method, mobile communication system, routing device, management device, and program in which, even when a mobile terminal moves and an access router acting as routing device in which a proxy function for the mobile terminal is set is changed, security association for the mobile terminal can be built in the destination routing device.

To achieve the above object, the present invention comprises:

a mobile terminal;

a management device that manages movement information on the mobile terminal; and a routing device, provided with an access network, and transferring a packet between a mobile terminal lying in the access network and the management device, security association for the mobile terminal being built between the routing device and the management device, wherein when the mobile terminal moves from the access network of the routing device from an access network of another routing device, the routing device specifies said another routing device as alternate routing device toward the management device, and when the mobile terminal moves from the access network of said another routing device to the access network of the routing device, the routing device specifies said another routing device as original routing device toward the management device, and at the same time specifies the routing device as alternate routing device toward the management device, and wherein the management device performs shifting from security association built for the mobile terminal between the management device and a routing device provided with an originating access network of the mobile terminal to security association for the mobile terminal between the management device and a routing device provided with a destination access network of the mobile terminal.

Also, the routing device transfers to the management device, unique information on destination in the routing device, of a mobile terminal lying in an access network with which the routing device is provided, and when the mobile terminal moves from the access network of the routing device to an access network of another routing device, the routing device acquires unique information on destination of the mobile terminal in the routing device provided with the destination access network and transfers the unique information on destination as alternate information to the management device and at the same time transfers the unique information on destination of the mobile terminal in the routing device to said another routing device, and when the mobile terminal moves from an access network of another routing device to the access network of the routing device, the routing device transfers unique information on destination of the mobile terminal in the routing device as alternate information to the management device and at the same time specifies unique information on destination of the mobile terminal in said another routing device, transferred from said another routing device, as original information to the management device, and when the management device builds security association for the mobile terminal between the management device and the routing device by use of the unique information on destination transferred from the routing device, and the unique information on destination transferred as the original information from the routing device is retained by the management device in order to build the security association, and the unique information on destination transferred as the alternate information from the routing device provided with the destination access network of the mobile terminal is the unique information on destination transferred as the alternate information from the routing device provided with the originating access network of the mobile terminal, the management device makes shifting from the security association built for the mobile terminal between the management device and the routing device provided with the originating access network of the mobile terminal to security association for the mobile terminal between the management device and the routing device provided with the destination access network of the mobile terminal.

Also, when deletion of the security association built for the mobile terminal between the originating routing device of the mobile terminal and the management device is specified in the routing device, the management device makes shifting from the security association built for the mobile terminal between the routing device and the management device to security association for the mobile terminal between the destination routing device of the mobile terminal and the management device.

Also, the management device modifies as the original information the unique information on destination transferred as the alternate information from the routing device provided with the originating access network of the mobile terminal, and thereby makes shifting from the security association built for the mobile terminal between the management device and the routing device provided with the originating access network of the mobile terminal to security association for the mobile terminal between the management device and the routing device provided with the destination access network of the mobile terminal.

According to the present invention having the above described configuration, when a mobile terminal moves after security association for the mobile terminal between a first routing device provided with an access network where the mobile terminal lies and a management device that manages movement information on mobile terminal has been built, when the first routing device specifies as alternate routing device a second routing device provided with an destination access network of the mobile terminal toward the management device, and the second routing device specifies the first routing device as original routing device toward the management device, and at the same time specifies the second routing device as alternate routing device toward the management device, shifting is made from the security association built for the mobile terminal between the first routing device and the management device to security association for the mobile terminal between the second routing device and the management device.

More specifically, when the mobile terminal moves after the unique information on destination of the mobile terminal in the first routing device is transferred from the first routing device to the management device and at the same time the unique information of the management device is transferred from the management device to the first routing device to thereby build security association for the mobile terminal between the first routing device and management device, when the first routing device acquires the unique information on destination of the mobile terminal in the second routing device and specifies the unique information on destination as alternate information toward the management device and at the same time transfers the unique information on destination of the mobile terminal in the first routing device from the first routing device to the second routing device, and the second routing device specifies as alternate information the unique information on destination of the mobile terminal in the second routing device toward the management device and at the same time specifies as original information the unique information on destination of the mobile terminal in the first routing device transferred from the first routing device toward the management device, and transfers the unique information of the management device from the management device to the second routing device, when the unique information on destination transferred as original information from the second routing device is retained by the management device to build security association, and at the same time the unique information on destination transferred as alternate information from the second routing device is the unique information on destination transferred as alternate information from the first routing device, shifting is made from the security association built for the mobile terminal between the first routing device and management device to security association for the mobile terminal between the second routing device and management device.

In this way, even when the mobile terminal moves and a routing device in which a proxy function for the mobile terminal is set is changed, the routing device in which security association has been built is set as original and a destination routing device of the mobile terminal is set as alternate and thereafter shifting is made by use of these from the security association which has already been built to security association in the destination routing device of the mobile terminal.

Further, if this shifting is made after deletion of the security association built for the mobile terminal between the first routing device and management device is specified in the first routing device, security is further improved.

As described above, according to the present invention, when the mobile terminal moves and a routing device in which a proxy function for the mobile terminal is set is changed, the routing device in which the security association has been built is set as original and a destination routing device of the mobile terminal is set as alternate and thereafter shifting is made by use of these from the security association which has already been built to security association in the destination routing device of the mobile terminal. Accordingly, even when the mobile terminal for which security association has been built moves and the access router in which a proxy function for the mobile terminal is set is changed, security association for the mobile terminal can also be built in the destination access router.

BRIEF DESCRIPTION OF THE DRAWINGS

FIG. 5 is a view illustrating an exemplary table set in a memory in an access router illustrated in FIG. 2;

FIG. 6 is a view illustrating an exemplary table set in a binding cache in the home agent illustrated in FIG. 2;

BEST MODE FOR CARRYING OUT THE INVENTION

Figure 2:
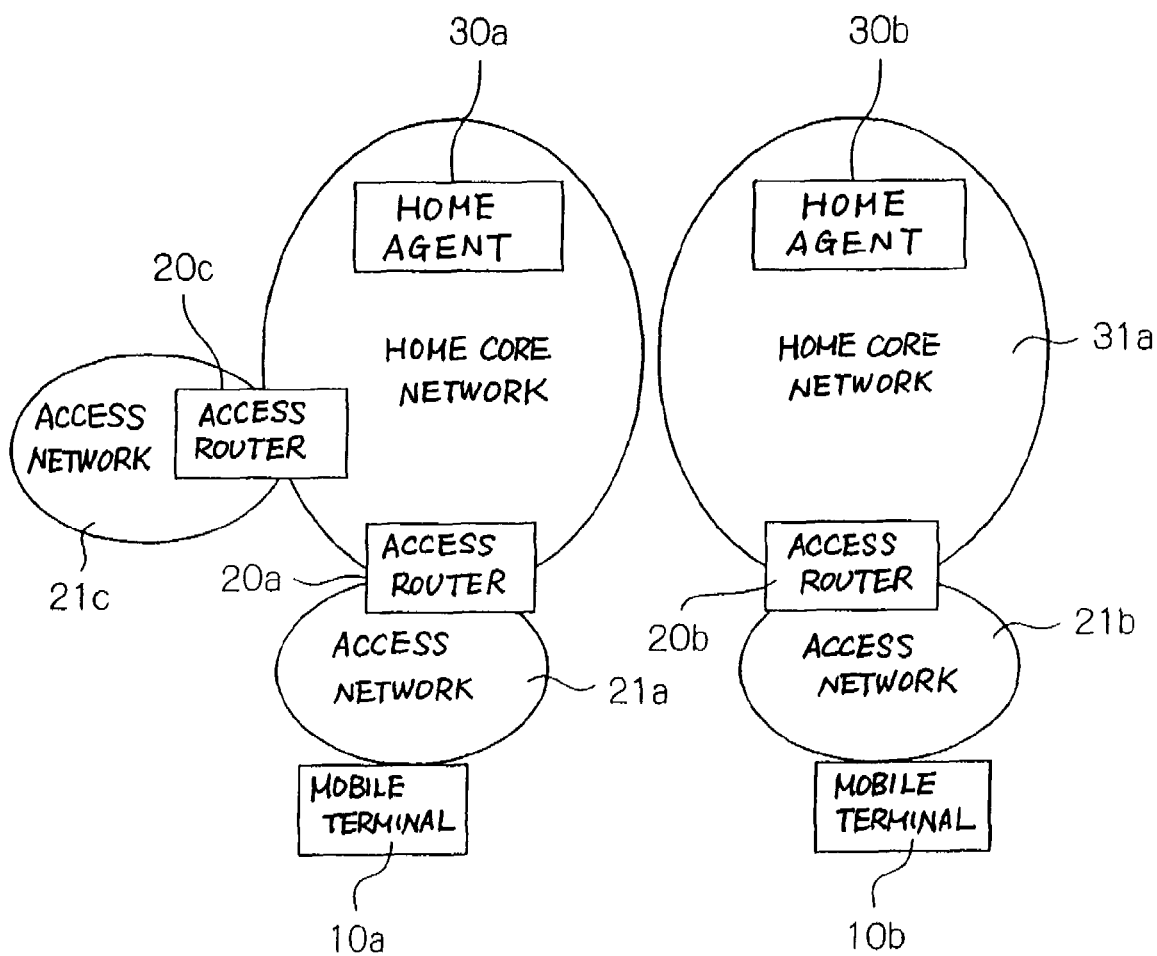
FIG. 2 is a view illustrating an exemplary embodiment of a mobile communication system according to the present invention.

FIG. 2 is a view illustrating an exemplary embodiment of a mobile communication system according to the present invention;

As illustrated in FIG. 2, according to exemplary embodiment, there are arranged two home agents 30a and 30b acting as management device respectively having home core networks 31a and 31b; communication based on IP packet transmission/reception is to be performed between mobile terminal 10a having movement information managed by home agent 30a and mobile terminal 10b having movement information managed by home agent 30b. Mobile terminal 10a lies in access network 21a with which access router 20a acting as a first routing device is provided, access network 21a being under access router 20a; mobile terminal 10b lies in access network 21b with which access router 20b is provided, access network 21b being under access router 20b. Further, there lies access network 21c connectable via access router 20c acting as a second routing device to home agent 30a. In this case, mobile terminals 10a and 10b have home addresses "HoA1" and "HoA2" acting as unique IP address, respectively; home addresses "HoA1" and "HoA2" are registered with home agents 30a and 30b, respectively. Also, access routers 20a and 20b have as self IP address, care-of addresses "CoA1" and "CoA2" of mobile terminals 10a and 10b lying in access networks 21a and 21b under access routers 20a and 20b, respectively. When access routers 20a and 20b sends location registration request (BU) about mobile terminals 10a and 10b to home agents 30a and 30b, home addresses "HoA1" and "HoA2" and care-of addresses "CoA1" and "CoA2" are associated with each other and registered and managed by home agents 30a and 30b.

Figure 3:
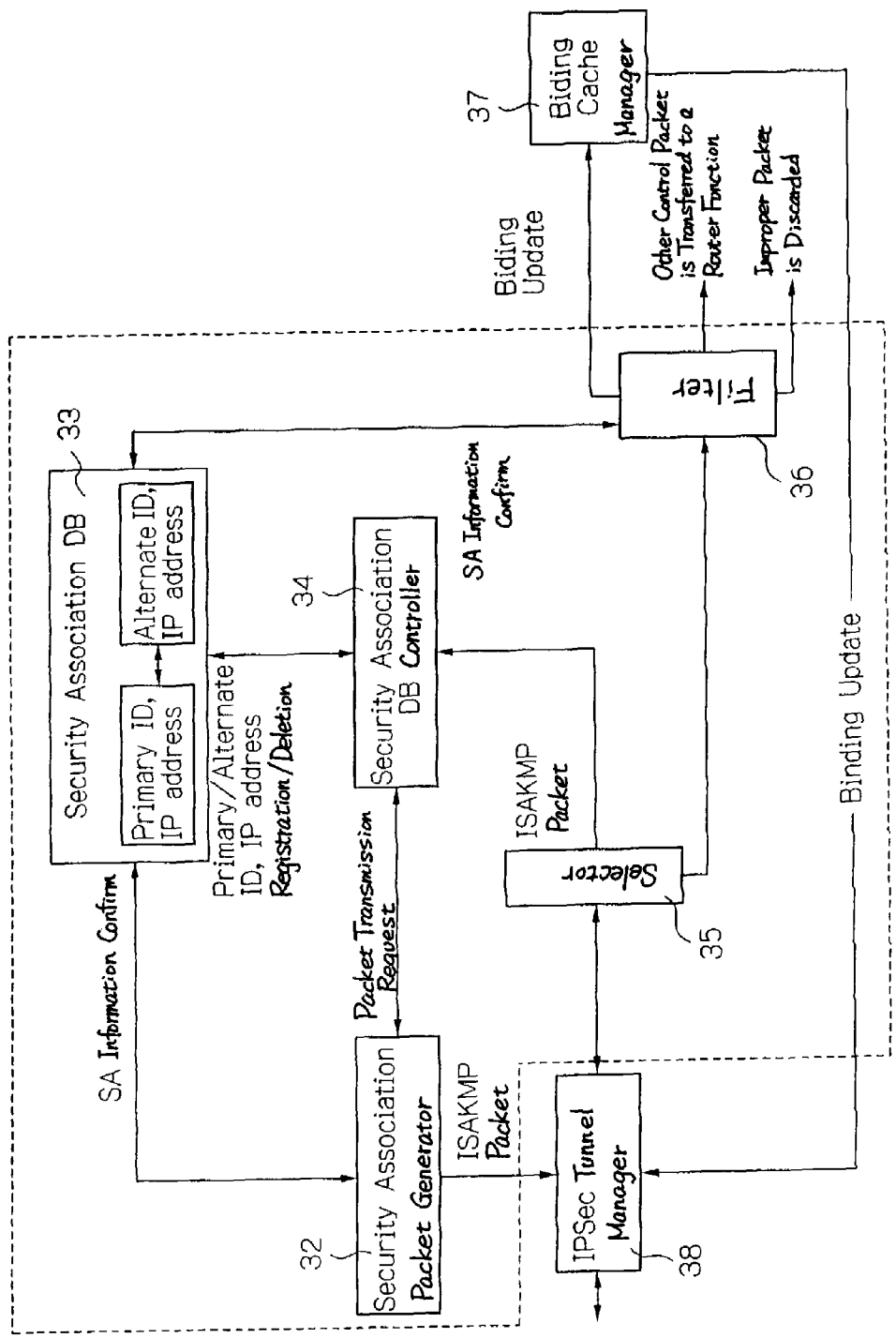
FIG. 3 is a block diagram illustrating a configuration of security association management means for managing security association, the security association management means being included in the configuration of a home agent illustrated in FIG. 2.

FIG. 3 is a block diagram illustrating a configuration of security association management means for managing security association, the security association management means being included in the configuration of home agent 30a illustrated in FIG. 2

As illustrated in FIG. 3, in order to implement security association management means for performing security association management, home agent 30a is provided with Security Association packet generator 32, Security Association data base 33, Security Association data base controller 34, selector 35, and filter 36.

Selector 35 divides a control-related packet received by IPsec tunnel manager 38 into an IP packet for building security association, i.e., an IP packet received on ISAKMP and the other IP packets and outputs them.

Using the IP packet for building security association, contained in the control-related packet received by IPsec tunnel manager 38, and divided by the selector 35, Security Association data base controller 34 performs registration or deletion of PrimaryID and IP address acting as original information in Security Association data base 33, and Alternate ID and IP address acting as alternate information, and at the same time sends a packet transmission request for building security association to Security Association packet generator 32.

In response to the packet transmission request sent from Security Association data base controller 34, Security Association packet generator 32 consults Security Association data base 33 and generates and transmits an IP packet for building security association.

Filter 36 consults Security Association data base 33 and divides the other IP packets separated from the IP packet for building security association by selector 35 into a packet for making location registration request (BU), i.e., a packet containing the home address and care of address of mobile terminal, a control-related packet from a mobile terminal for which security association has been built, and a packet from a mobile terminal for which security association has not been built, and outputs them.

Of the packets obtained as a result of division, the packet containing the home address and care of address of mobile terminal is registered with a binding cache (BC), wherein the home address and care of address are associated with each other, and the control-related packet from a mobile terminal for which security association has been built is transferred to a router function (not illustrated), and a packet from a mobile terminal for which security association has not been built is discarded as improper packet.

A mobile communication control method in the mobile communication system having the above described configuration will be described by taking as an example a case where security association for mobile terminal 10a is built between home agent 30a and access routers 20a and 20c, and IP packets are transmitted/received between mobile terminals 10a and 10b.

Figure 4:
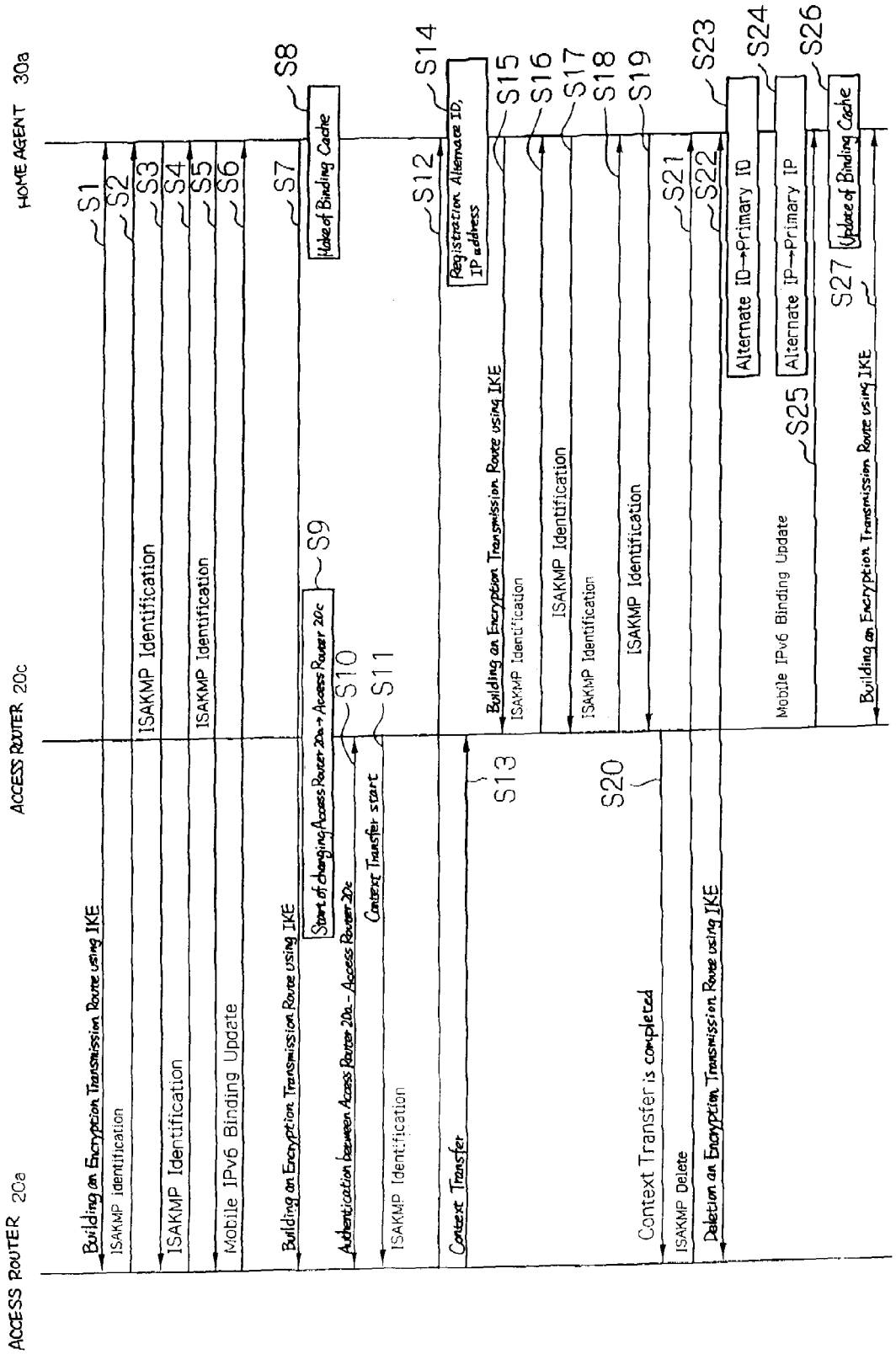
FIG. 4 is a sequence diagram for explaining a processing when security association for a mobile terminal is built between a home agent and access router in the mobile communication system illustrated in FIGS. 2 and 3.

FIG. 4 is a sequence diagram for explaining a processing when security association for mobile terminal 10a is built between home agent 30a and access routers 20a and 20c in the mobile communication system illustrated in FIGS. 2 and 3.

When mobile terminal 10a moves from home core network 31a under home agent 30a or another access network to access network 21a under access router 20a, firstly in access router 20a under which lies access network 21a to which mobile terminal 10a has moved, care of address for mobile terminal 10a is generated by use of prefix of IP address of access router 20a and MAC address of mobile terminal 10a, and this care of address and the home address of mobile terminal 10a are associated with each other and registered with an internal memory. As a result, a proxy function of mobile terminal 10a using the generated care of address is set in access router 20a.

FIG. 5 is a view illustrating an exemplary table set in the memory in access router 20a illustrated in FIG. 2.

As illustrated in FIG. 5, in access router 20a, with respect to each of mobile terminals lying in access network 21a under access router 20a, the home address (HoA) and care of address (CoA) are registered with the memory while being associated with each other and set on a table.

Subsequently, between access router 20a and home agent 30a, by use of IKE (The Internet Key Exchange), there is built an encryption transmission route for signaling between the care of address for mobile terminal 10a and the home address of home agent 30a (step S1). Here, the encryption transmission route for signaling is an encryption transmission route for transferring an IP packet for building security association, the IP packet being exchanged, as described below, between access router 20a and home agent 30a.

Subsequently, on ISAKMP, FQDN for mobile terminal 10a in access router 20a is transferred as unique information on destination of access router 20a in access router 20a from access router 20a to home agent 30a (step S2). In this case, the transfer of FQDN for mobile terminal 10a in access router 20a to home agent 30a is performed by security association management means (not illustrated) in access router 20a. This FQDN for mobile terminal 10a in access router 20a is received by IPsec tunnel manager 38 of home agent 30a and sent via selector 35 to Security Association data base controller 34; Security Association data base controller 34 registers FQDN for mobile terminal 10a in access router 20a, as PrimaryID, with Security Association data base 33.

Then, Security Association data base controller 34 sends a packet transmission request to Security Association packet generator 32 of home agent 30a, and Security Association packet generator 32 generates a packet containing FQDN being the unique information of home agent 30a, and this packet is transferred on ISAKMP from home agent 30a to access router 20a (step S3).

Subsequently, the home address of mobile terminal 10a is transferred on ISAKMP from access router 20a to home agent 30a (step S4); in response to this, Security Association packet generator 32 of home agent 30a generates a packet containing an IP address being unique information of home agent 30a, and this packet is transferred on ISAKMP from home agent 30a to access router 20a (step S5). In this case, the transfer of the home address of mobile terminal 10a to home agent 30a is also performed by the security association management means in access router 20a.

Thereafter, a combination of the home address of mobile terminal 10a and the care of address, generated for mobile terminal 10a by access router 20a, and acting as unique information on destination of mobile terminal 10a, is sent from access router 20a to home agent 30a, whereby location registration request (BU) is made (step S6). This care of address is received by IPsec tunnel manager 38 of home agent 30a and sent via selector 35 to Security Association data base controller 34; Security Association data base controller 34 registers the care of address for mobile terminal 10a in access router 20a as PrimaryIP address with Security Association data base 33.

Then, between access router 20a and home agent 30a, by use of IKE, there is built an encryption transmission route for user data between the care of address for mobile terminal 10a and the home address of home agent 30a (step S7) and at the same time after its validity is verified by home agent 30a, Binding cache manager 37 associates the home address and care of address sent from mobile terminal 10a and registers them with a binding cache (BC) in home agent 30a (step S8). Here, the encryption transmission route for user data is an encryption transmission route for transferring user data between access router 20a and home agent 30a.

FIG. 6 is a view illustrating an exemplary table set in the binding cache in the home agent 30a illustrated in FIG. 2.

As illustrated in FIG. 6, in home agent 30a, of each mobile terminal to be managed in location, the home address (HoA) and care of address (CoA) are registered with the binding cache (BC) while being associated with each other and set on a table.

In this way, security association is built, and thereafter home agents 30a and 30b receive only IP packets sent from mobile terminals for which security association has been built.

When an IP packet having home address "HoA1" of mobile terminal 10a as originating address and home address "HoA2" of mobile terminal 10b as destination address is sent from mobile terminal 10a to mobile terminal 10b for which security association has been built, as described above, between home agents 30a and 30b and access routers 20a and 20b, then access router 20a encapsulates the IP packet sent from mobile terminal 10a by setting care of address "CoA1" for mobile terminal 10a as originating address and IP address "HA1" of home agent 30a as destination address.

Figure 7A:
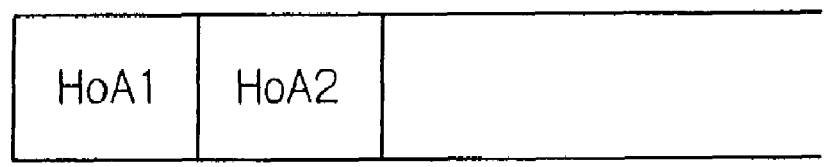
FIG. 7a is a view illustrating a state of packet before encapsulation for explaining encapsulation in the access router illustrated in FIG. 2.
Figure 7B:
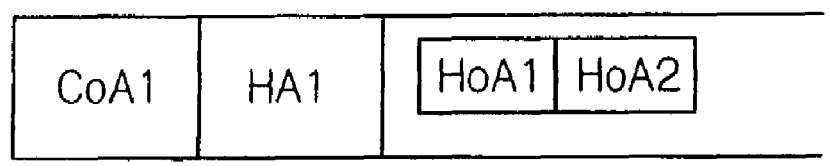
FIG. 7b is a view illustrating a state of packet after encapsulation for explaining encapsulation in the access router illustrated in FIG. 2.

FIG. 7a is a view illustrating a state of packet before encapsulation for explaining encapsulation in access router 20a illustrated in FIG. 2. FIG. 7b is a view illustrating a state of packet after encapsulation for explaining encapsulation in access router 20a illustrated in FIG. 2.

When an IP packet having home address "HoA1" of mobile terminal 10a as originating address and home address "HoA2" of mobile terminal 10b as destination address is, as illustrated in FIG. 7a, sent from mobile terminal 10a, access router 20a encapsulates, as illustrated in FIG. 7b, the IP packet by setting care of address "CoA1" for mobile terminal 10a as originating address and IP address "HA1" of home agent 30a as destination address, and transfers the IP packet.

The IP packet encapsulated by access router 20a, having IP address "HA1" of home agent 30a as destination address, is delivered to home agent 30a. Upon reception of the IP packet sent from mobile terminal 10b, home agent 30a decapsulates the received IP packet and sends an IP packet having "HoA1" as originating address and "HoA2" as destination address.

The IP packet sent from home agent 30a, having "HoA2" as destination address, is delivered to home agent 30b. In home agent 30b, upon reception of the IP packet sent from home agent 30a, the binding cache in home agent 30b is consulted, and the care of address "CoA2" of mobile terminal 10b being the destination of the IP packet is recognized, and the received IP packet is encapsulated by using IP address "HA2" of home agent 30b as originating address and "CoA2" as destination address and is sent.

Figure 8A:
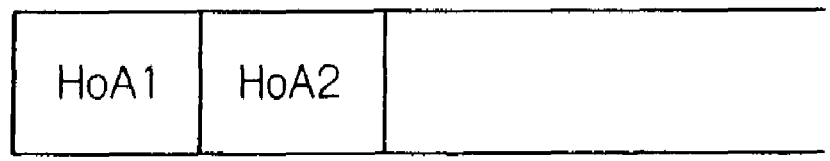
FIG. 8a is a view illustrating a state of packet before encapsulation for explaining encapsulation in the home agent illustrated in FIG. 2.
Figure 8B:
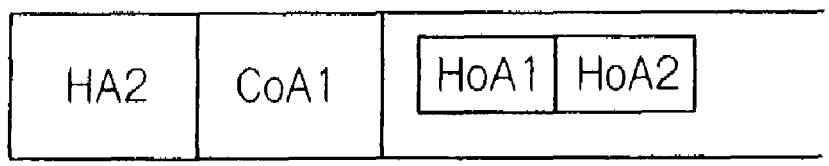
FIG. 8b is a view illustrating a state of packet after encapsulation for explaining encapsulation in the home agent illustrated in FIG. 2.

FIG. 8a is a view illustrating a state of packet before encapsulation for explaining encapsulation in home agent 30b illustrated in FIG. 2. FIG. 8b is a view illustrating a state of packet after encapsulation for explaining encapsulation in home agent 30b illustrated in FIG. 2.

When an IP packet having home address "HoA1" of mobile terminal 10a as originating address and home address "HoA2" of mobile terminal 10b as destination address is, as illustrated in FIG. 8a, sent from home agent 30a, home agent 30b encapsulates, as illustrated in FIG. 8b, the IP packet by using IP address "HA2" of home agent 30b as originating address and care of address "CoA2" for mobile terminal 10b as destination address, and transfers the IP packet.

The IP packet sent from home agent 30b, having "CoA2" as destination address, is delivered to access router 20b. Upon reception of the IP packet sent from home agent 30b, access router 20b decapsulates the received IP packet, and sends an IP packet having "HoA1" as originating address and "HoA2" as destination address to mobile terminal 10b.

As a result, the IP packet sent from mobile terminal 10a is received by mobile terminal 10b.

The processing when mobile terminal 10a moves from access network 21a to access network 21c, will now be described with reference to the sequence diagram of FIG. 4.

At step S7, between access router 20a and home agent 30a, by use of IKE, there is built an encryption transmission route for user data between the care of address for mobile terminal 10a and the home address of home agent 30a. At step S8, the home address and care of address sent from mobile terminal 10a are associated with each other and registered with the binding cache (BC) in home agent 30a and thereafter movement of mobile terminal 10a from access network 21a to access network 21c causes access router 20c under which access network 21c lies, to generate care of address for mobile terminal 10a by use of prefix of IP address of access router 20c and MAC address of mobile terminal 10a, and the care of address and the home address of mobile terminal 10a are associated with each other and registered with an internal memory. As a result, a proxy function for mobile terminal 10a using the generated care of address is set in access router 20c (step S9). Also, access router 20c sends CN (Correspondent Node) information request command having the IP address of access router 20c as originating address and the home address of mobile terminal 10a as destination address. As a result, authentication between access router 20a under which access network 21a being the origin of mobile terminal 10a lies and access router 20c under which access network 21c being destination of mobile terminal 10a lies, and Context Transfer therebetween are started (step S10, S11). Here, in the CN information request command from access router 20c, there are contained, as payload, information indicating that this command is CN information request command, the home address of mobile terminal 10a, FQDN for mobile terminal 10a in access router 20c, and the care of address for mobile terminal 10a generated by access router 20c.

The CN information request command sent from access router 20c is received via home agent 30a by access router 20a. Accordingly, access router 20a acquires FQDN for mobile terminal 10a in access router 20c and the care of address for mobile terminal 10a generated by access router 20c, the FQDN and care of address being unique information on destination of mobile terminal 10c.

Then, using the security association management means in access router 20a, the FQDN for mobile terminal 10a in access router 20c and the care of address for mobile terminal 10a generated by access router 20c, contained in the received CN information request command are transferred, as AlternateID and AlternateIP address acting as alternate information, from access router 20a to home agent 30a on ISAKMP (step S12). As a result, access router 20a specifies access router 20c as alternate routing device toward home agent 30a.

Subsequently, the information which mobile terminal 10a has used in access router 20a is transferred from access router 20a to access router 20c (step S13), the information including the unique information on destination of mobile terminal 10a in access router 20a, the unique information being the FQDN of mobile terminal 10a in access router 20a and the care of address of mobile terminal 10a generated by access router 20a. This information transfer can be performed, for example via wireless/cabled communication route or via a network. However, the FQDN of mobile terminal 10a in access router 20a and the care of address of mobile terminal 10a generated by access router 20a are preferably transferred via a secure communication route using encryption.

Also, in home agent 30a, FQDN for mobile terminal 10a in access router 20c and the care of address for mobile terminal 10a generated by access router 20c, transferred from access router 20a are received by IPsec tunnel manager 38 of home agent 30a, and is sent via selector 35 to Security Association data base controller 34; then FQDN for mobile terminal 10a in access router 20c and this care of address for mobile terminal 10a generated by access router 20c are registered as AlternateID and AlternateIP address, respectively, with Security Association data base 33 by Security Association data base controller 34 (step S14). In this case, this FQDN for mobile terminal 10a in access router 20c and the care of address for mobile terminal 10a generated by access router 20c has been sent from access router 20a which has already built security association with home agent 30a, so this is reliable information in home agent 30a.

Subsequently, between access router 20c and home agent 30a, using IKE, there is built an encryption transmission route for signaling between the care of address for mobile terminal 10a and the home address of home agent 30a (step S15).

Subsequently, FQDN for mobile terminal 10a in access router 20a and FQDN for mobile terminal 10a in access router 20c are transferred on ISAKMP as PrimaryID acting as original information and AlternateID acting as alternate information, respectively, from access router 20c to home agent 30a by security association management means (not illustrated) in access router 20c (step S16).

Then, Security Association packet generator 32 of home agent 30a generates a packet containing FQDN being unique information of home agent 30a, and this packet is transferred on ISAKMP from home agent 30a to access router 20c (step S17).

Subsequently, the care of address for mobile terminal 10a generated by access router 20a and the care of address for mobile terminal 10a generated by access router 20c are transferred on ISAKMP as PrimaryIP address acting as original information and AlternateIP address acting as alternate information, respectively, from access router 20c to home agent 30a by security association management means (not illustrated) in access router 20c (step S18). As a result of this transfer of Primary ID and PrimaryIP address from access router 20c at steps S16 and S18, access router 20a is specified as original routing device by access router 20c. Also, as a result of transferring AlternateID and AlternateIP address from access router 20c, access router 20c is specified as alternate routing device by access router 20c.

Then, Security Association packet generator 32 of home agent 30a generates a packet containing IP address being unique information of home agent 30a. This packet is transferred on ISAKMP from home agent 30a to access router 20c (step S19).

Thereafter, when Context Transfer from access router 20c to access router 20a is completed (step S20), a request for deleting security association for mobile terminal 10a between access router 20a and home agent 30a is made by access router 20a (step S21). This request from access router 20a to home agent 30a is also performed by the security association management means in access router 20a.

In home agent 30a, FQDN for mobile terminal 10a in access router 20a transferred as PrimaryID from access router 20c at step S16 has already been transferred from access router 20a having reliability and registered as PrimaryID with Security Association data base 33; and FQDN for mobile terminal 10a in access router 20c transferred as AlternateID from access router 20c at step S16 has already been transferred from access router 20a having reliability and registered as AlternateID with Security Association data base 33; and the care of address for mobile terminal 10a generated by access router 20a, transferred as PrimaryIP address from access router 20c at step S18 has already been transferred from access router 20a having reliability and registered as PrimaryIP address with Security Association data base 33; the care of address for mobile terminal 10a generated by access router 20c, transferred as AlternateIP address from access router 20c at step S18 has already been transferred from access router 20a having reliability and registered as AlternateIP address with Security Association data base 33. Accordingly, in response to the request from access router 20a, the encryption transmission route for signaling between the care of address for mobile terminal 10a and the home address of home agent 30a is deleted by use of IKE between access router 20a and home agent 30a (step S22).

Also, Security Association data base controller 34 of home agent 30a modifies as PrimaryID, FQDN of mobile terminal 10a in access router 20c registered as AlternateID with Security Association data base 33 (step S23), and modifies as PrimaryIP address the care of address for mobile terminal 10a generated by access router 20c, registered as AlternateIP address with Security Association data base 33 is modified (step S24).

Thereafter, a combination of the home address of mobile terminal 10a and the care of address for mobile terminal 10a generated by access router 20c is sent from access router 20c to home agent 30a, whereby location registration request (BU) is made (step S25). After verification of its validity in home agent 30a, Binding cache manager 37 associates the home address and care of address sent from mobile terminal 10c and registers them with binding cache (BC) in home agent 30a (step S26).

Also, between access router 20c and home agent 30a, using IKE, there is built an encryption transmission route for user data between the care of address for mobile terminal 10a and the home address of home agent 30a (step S27).

In this way, shifting is made from the security association built for mobile terminal 10a between access router 20a under which access network 21a being the origin of mobile terminal 10a lies, and home agent 30a to the security association for mobile terminal 10a between access router 20c under which access network 21c being the destination of mobile terminal 10a lies, and home agent 30a.

According to the present invention, it is noted that, instead of implementing the processings in access routers 20a and 20c and home agent 30a by use of the above specified hardware, a program for implementing that function may be recorded onto a recording medium readable by access routers 20a and 20c and home agent 30a, the program recorded onto the recording medium being read into access routers 20a and 20c and home agent 30a for execution. "The recording medium readable by access routers 20a and 20c and home agent 30a" indicates a movable recording medium such as floppy disk, magnetic optical disk, DVD or CD, and further indicates HDD or the like incorporated in access routers 20a and 20c and home agent 30a. The program recorded on the recording medium is read, for example, by a control block; processings similar to the above described ones are performed under control of the control block.

The invention claimed is:

1. A mobile communication control method for use in a mobile communication system comprising: a mobile terminal; a management device that manages movement information on the mobile terminal; and at least one routing device, provided with an access network, and transferring a packet between a mobile terminal lying in the access network and the management device, the mobile communication control method comprising:

building a first security association for the mobile terminal between the management device and a first routing device provided with a first access network in which the mobile terminal lies, comprising:
the first routing device transferring unique information on a destination of the mobile terminal, as generated by in the first routing device, to the management device, and
at the same time, the management device transferring unique information on the management device to the first routing device,
to thereby build the first security association for the mobile terminal between the first routing device and the management device;

upon movement of the mobile terminal from the first access network to a second access network of a second routing device:
the first mobile device receiving unique information on a destination of the mobile terminal as generated by the second routing device, the second routing device provided with the second access network as a destination access network of the mobile terminal;

the first routing device informing the management device that the second routing device is an alternate routing device by:
   the first mobile device transferring the received unique information on the destination of the mobile terminal as alternate information to the management device;
the first routing device transferring the unique information on the destination of the mobile terminal as generated by the first routing device to the second routing device;
the second routing device informing the management device that the first routing device is an original routing device and that the second routing device is the alternate routing device by:
   the second routing device transferring the unique information on the destination of the mobile terminal as generated by the second routing device as alternate information to the management device and, at the same time, the second routing device transferring the unique information on the destination of the mobile terminal as established in the first routing device as original information to the management device; and
the management device transferring the unique information on the management device to the second routing device;
wherein:
when the unique information on the destination of the mobile terminal as established in the first routing device, transferred from the second routing device to the management device as original information, is retained by the management device in order to build the first security association, and, at the same time, the unique information on the destination of the mobile terminal as established in the second routing device, transferred from the second routing device to the management device as alternate information, is the same as the unique information on the destination of the mobile device as established in the second routing device, transferred from the first routing device to the management device as alternate information, making a shift from the first security association built for the mobile terminal between the first routing device and the management device to a second security association for the mobile terminal between the second routing device and the management device.

2. The mobile communication control method according to claim 1, characterized in that, when deletion of the first security association built for the mobile terminal between the first routing device and the management device is specified in the first routing device, the shift is made from the first security association built for the mobile terminal between the first routing device and the management device to the second security association for the mobile terminal between the second routing device and the management device.

3. The mobile communication control method according to claim 2, characterized in that, when the unique information on destination of the mobile terminal as established in the second routing device, transferred from the first routing device to the management device is modified as the original information, the shift is made from the first security association built for the mobile terminal between the first routing device and the management device to the second security association for the mobile terminal between the second routing device and the management device.

4. The mobile communication control method according to claim 1, characterized in that, when the unique information on destination of the mobile terminal as established in the second routing device, transferred from the first routing device to the management device is modified as the original information, the shift is made from the first security association built for the mobile terminal between the first routing device and the management device to the second security association for the mobile terminal between the second routing device and the management device.

5. A mobile communication system comprising:
a mobile terminal;
a management device that manages movement information on the mobile terminal;
a first routing device, provided with a first access network; and
a second routing device, provided with a second access network;
wherein the first routing device provides to the management device, unique information on the destination of the mobile terminal, lying in the first access network, as generated by the first routing device, and the management device builds a first security association for the mobile terminal between the first routing device and the management device;
when the mobile terminal moves from the first access network of the first routing device, as an originating access network, to the second access network of the second routing device, as a destination access network, the first routing device acquires unique information on the destination of the mobile terminal as generated by the second routing device and provides the received unique information on the destination of the mobile terminal as generated by the second routing device as alternate information to the management device and, at the same time, the first routing device provides the unique information on the destination of the mobile terminal as generated by the first routing device to the second routing device, and
when the mobile terminal moves from the second access network of the second routing device, as the originating access network, to the first access network of the first routing device, as the destination access network, the first routing device transfers unique information on the destination of the mobile terminal as generated by the first mobile device as alternate information to the management device and at the same time transfers unique information on the destination of the mobile terminal as generated by the second routing device as original information to the management device, and
wherein when the management device builds security association for the mobile terminal between the routing device and the management device, when the unique information on destination of the mobile device received by the management device as the alternate information from a routing device provided with the destination access network is the same as the unique information on destination of the mobile device received by the management device as the alternate information from a routing device provided with the originating access network, the management device makes a shift from the security association built for the mobile terminal between the management device and the routing device provided with the originating access network to security association of the mobile terminal between the management device and the routing device provided with the destination access network.

6. The mobile communication system according to claim 5, wherein when an originating routing device specifies a deletion of a security association built for the mobile terminal between an originating routing device and the management device, the management device makes a shift from the security association built for the mobile terminal between the originating routing device and the management device to a security association of the mobile terminal between a destination routing device and the management device.

7. The mobile communication system according to claim 6, wherein when the management device stores, as original information, the unique information on destination of the mobile terminal received by the management device from the routing device provided with the originating access network, the management device makes a shift from the security association built for the mobile terminal between the management device and the routing device provided with the originating access network to the security association for the mobile terminal between the management device and the routing device provided with the destination access network.

8. The mobile communication system according to claim 5, wherein when the management device stores, as original information, the unique information on destination of the mobile terminal received by the management device from the routing device provided with the originating access network, the management device makes a shift from the security association built for the mobile terminal between the management device and the routing device provided with the originating access network to the security association for the mobile terminal between the management device and the routing device provided with the destination access network.

9. A first routing device, provided with a first access network, which transfers packets between a mobile terminal lying in the first access network and a management device that manages movement information of the mobile terminal, wherein a security association for the mobile terminal is built between the first routing device and the management device, the first routing device comprising:
   security association management means for, upon movement of the mobile terminal from the first access network to a second access network of a second routing device, informing the management device that the second routing device is an alternate routing device
   wherein the security association management means received unique information on the destination of the mobile terminal as generated by the second routing device and transfers the received unique information on the destination of the mobile terminal as generated by the second routing device as alternate information to the management device and at the same time, transfers the unique information on the destination of the mobile terminal as generated by the first routing device to the second routing device, and
   wherein, when the mobile terminal moves from the second access network of the second routing device to the first access network of the first routing device, the security association management means transfers the unique information on the destination of the mobile terminal as generated by the first routing device as alternate information to the management device and at the same time, transfers as original information, the unique information on the destination of the mobile terminal as generated in the second routing device to the management device.

10. A management device that manages movement information of a mobile terminal and builds a security association, for the mobile terminal lying in an access network of a routing device, between the management device and the routing device, the management device comprising:
   a storage means for storing a first security association built for the mobile terminal between a first routing device and the management device, the security association including unique information on a destination of the mobile terminal as generated by the first routing device;
   a security association management means for, when the mobile terminal moves from a first access network of a first routing device to a second access network of a second routing device, and the first routing device specifies that the second routing device is an alternate routing device, and the second routing device specifies that the first routing device is an original routing device and that the second routing device is the alternate routing device, making a shift from the first security association to a second security association between the second routing device and the management terminal;
   tunnel manager means for receiving, original information from the second routing device, wherein the original information has already been retained in the storage means as the unique information on the destination of the mobile terminal, and at the same time receiving, from the second routing device, unique information on the destination of the mobile terminal as alternate information which is the same as unique information on the destination of the mobile terminal already received from the first routing device as the alternate information,
   wherein the security association management means makes the shift from the first security association built for the mobile terminal between the first routing device and the management device to a security association for the mobile terminal between the second routing device and the management device based on the tunnel manager means receiving the original information from the second routing device which has already been retained in the storage means and receiving from the second routing device the alternate information which is the same as the alternate information already received from the first routing device.

11. The management device according to claim 10, wherein when the first routing device specifies a deletion of the first security association built for the mobile terminal between the first routing device and the management device, the security association management means makes the shift from the first security association built for the mobile terminal between the first routing device and the management device to the second security association for the mobile terminal between the second routing device and the management device.

12. The management device according to claim 11, wherein when the security association management means stores, as the original information, the unique information on destination of the mobile terminal received by the management device as the alternate information from the first routing device, the security association management means makes the shift from the first security association built for the mobile terminal between the first routing device and the management device to the second security association for the mobile terminal between the second routing device and the management device.

13. The management device according to claim 10,
wherein when the security association management means stores, as the original information, the unique information on destination of the mobile terminal received by the management device as the alternate information from the first routing device, the security association management means makes the shift from the first security association built for the mobile terminal between the first routing device and the management device to the second security association for the mobile terminal between the second routing device and the management device.

* * * * *

UNITED STATES PATENT AND TRADEMARK OFFICE
CERTIFICATE OF CORRECTION

| | | |
|---|---|---|
| PATENT NO. | : 7,953,081 B2 | Page 1 of 1 |
| APPLICATION NO. | : 11/909221 | |
| DATED | : May 31, 2011 | |
| INVENTOR(S) | : Hiroshi Dempo and Kaoru Yoshida | |

It is certified that error appears in the above-identified patent and that said Letters Patent is hereby corrected as shown below:

In the Drawings

Figure 1:
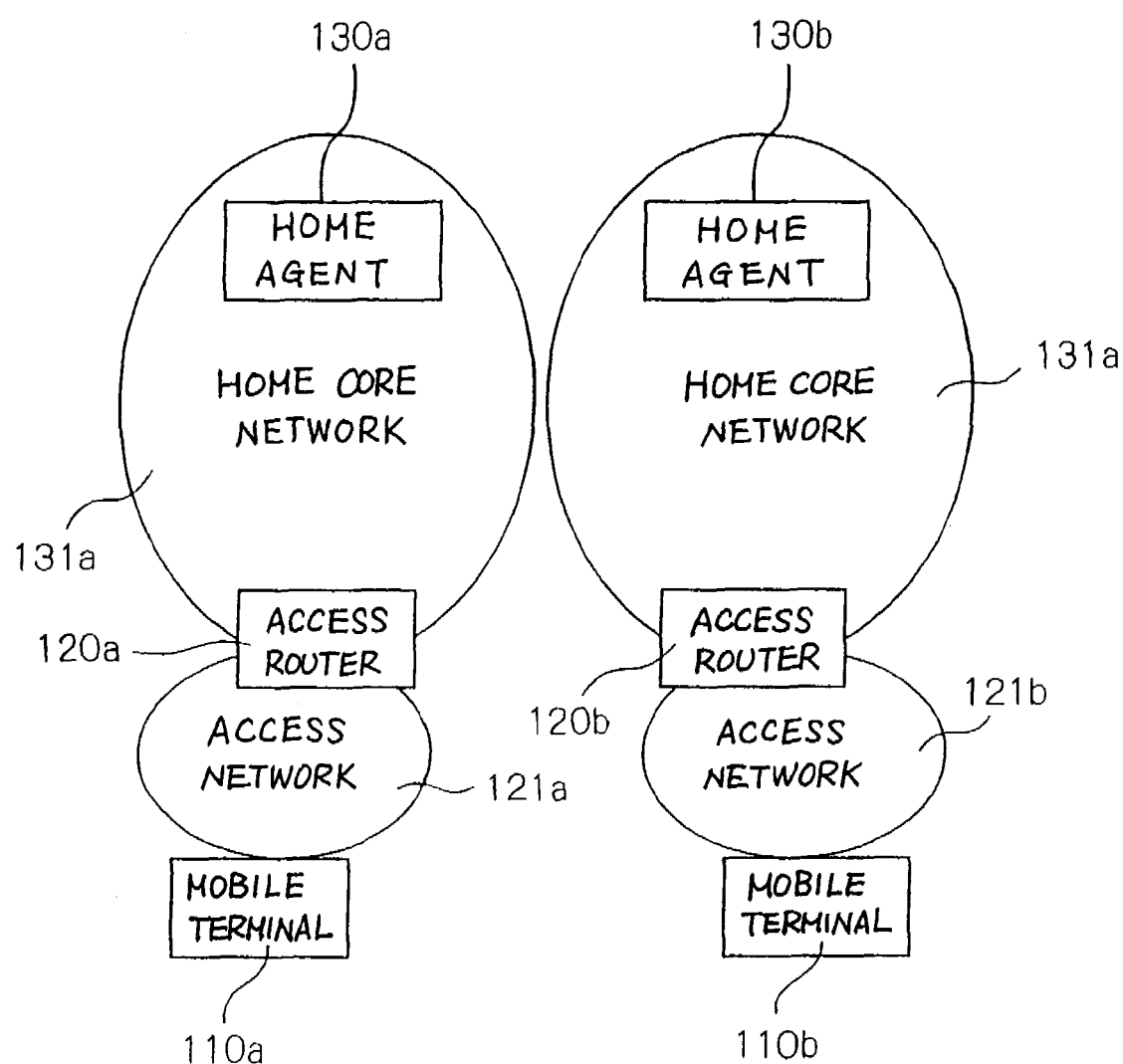
FIG. 1 is a view illustrating an exemplary configuration of a conventional mobile communication system based on mobile IPv6.

Drawing Sheet 1, Fig. 1: delete "131a" and insert -- 131b --

Drawing Sheet 2, Fig. 2: delete "31a" and insert -- 31b --

Signed and Sealed this
Twentieth Day of May, 2014

Michelle K. Lee
*Deputy Director of the United States Patent and Trademark Office*